United States Patent
Martins Salim et al.

(10) Patent No.: US 12,017,199 B2
(45) Date of Patent: Jun. 25, 2024

(54) PROCESS FOR PREPARING SULFATED ADSORBENTS, SULFATED ADSORBENTS AND USE

(71) Applicants: PETROLEO BRASILEIRO S.A.—PETROBRAS, Rio de Janeiro (BR); UNIVERSIDADE FEDERAL DO RIO DE JANEIRO—UFRJ, Rio de Janiero (BR)

(72) Inventors: Vera Maria Martins Salim, Rio de Janeiro (BR); Jailton Ferreira Do Nascimento, Rio de Janeiro (BR); Neuman Solange De Resende, Rio de Janeiro (BR); Carla Luciane Manske Camargo, Rio de Janeiro (BR); Amanda Gerhardt De Oliveira Ferreira, Rio de Janeiro (BR)

(73) Assignees: PETROLEO BRASILEIRO S.A.—PETROBRAS, Rio de Janeiro (BR); UNIVERSIDADE FEDERAL DO RIO DE JANEIRO—UFRJ, Rio de Janeiro (BR)

(*) Notice: Subject to any disclaimer, the term of this patent is extended or adjusted under 35 U.S.C. 154(b) by 219 days.

(21) Appl. No.: 17/506,296

(22) Filed: Oct. 20, 2021

(65) Prior Publication Data

US 2022/0126266 A1   Apr. 28, 2022

(30) Foreign Application Priority Data

Oct. 23, 2020 (BR) ..................... BR1020200218212

(51) Int. Cl.
  *B01J 20/04* (2006.01)
  *B01D 53/02* (2006.01)
  *B01J 20/30* (2006.01)
  *B01J 20/32* (2006.01)
  *C10L 3/10* (2006.01)

(52) U.S. Cl.
  CPC ............ *B01J 20/048* (2013.01); *B01D 53/02* (2013.01); *B01J 20/3085* (2013.01); *B01J 20/3204* (2013.01); *B01J 20/3225* (2013.01); *B01J 20/3236* (2013.01); *C10L 3/101* (2013.01); *B01D 2253/112* (2013.01); *B01D 2257/602* (2013.01); *B01J 2220/42* (2013.01); *C10L 2290/542* (2013.01)

(58) Field of Classification Search
  CPC .. B01J 20/048; B01J 20/3085; B01J 20/3204; B01J 20/3225; B01J 20/3236; B01D 53/02; C10L 3/101
  See application file for complete search history.

(56) References Cited

PUBLICATIONS

Zhang et al., Industral & Engineering Chem. Res., (2012), v51, p. 5292-5298.*
Yu et al., Environ. Sci. Pollut. Res., (2016), v23, p. 5056-5076.*

* cited by examiner

*Primary Examiner* — Yong L Chu
(74) *Attorney, Agent, or Firm* — RAPHAEL BELLUM PLLC (57) ABSTRACT

The present invention is in relation to a process for preparing calcium phosphate-based sulfated adsorbents that capture mercury in gas streams, comprised of the steps of synthesis of the precursors, incorporation of a transition metal, and sulfation of the material. These adsorbents present high efficiency both for removal of low concentrations of mercury, such as in natural gas, and for stabilization of this pollutant. The adsorbents obtained in the invention may be used in the Mercury Removal Units (MRUs) present in natural gas processing plants, which mercury removal units may be located either upstream or downstream of the dehydration and $H_2S$ removal units, due to the adsorbents obtained showing resistance to $H_2S$ poisoning, and maintaining their performance in the presence of water.

11 Claims, 9 Drawing Sheets

PROCESS FOR PREPARING SULFATED ADSORBENTS, SULFATED ADSORBENTS AND USE

FIELD OF THE INVENTION

This invention is in relation to a process to prepare adsorbents to capture mercury from gas streams, with application in mercury removal units (MRUs) present in natural gas processing plants, seeking to obtain adsorbents presenting high adsorbed mercury fixation capacity, elevated performance for mercury capture ($Hg^\circ$) in streams with low concentrations of the pollutant, resistance to $H_2S$ poisoning, and preservation of its performance in the presence of water.

DESCRIPTION OF THE STATE OF THE ART

The adsorbents most cited in the literature are regenerable, such as activated carbon modified with halides, transition metal oxides and noble metals supported on porous materials, as described in the reference by YU, J. G.; YUE, B. Y.; WU, X. W., et al. "Removal of mercury by adsorption: A review," Environmental Science and Pollution Research, v. 23 (6), pp. 5056-5076, 2016. For example, there are molecular screen-based, silver-modified commercial adsorbents. The disadvantage of the regenerable adsorbents is that at the end of their useful life, stabilization technologies are necessary to minimize the toxicity of the waste contaminated with mercury (residual adsorbent). Within this context, the focus of recent studies is the use of high-fixation adsorbents that are non-regenerable, making the subsequent step of stabilization or remediation unnecessary.

The studies by PILLAY, K.; CUKROWSKA, E. M.; COVILLE, N. J. "Improved uptake of mercury by sulfur-containing carbon nanotubes," Microchemical Journal, v. 108, pp. 124-130, 2013 and REDDY, S. K. K.; AL SHOAIBI, A.; SRINIVASAKANNAN, C. "Gas-phase mercury removal through sulfur impregnated porous carbon," Journal of Industrial and Engineering Chemistry, v. 20, pp. 2969-2974, 2014, emphasize the high affinity between mercury and sulfur and their capacity to stabilize this pollutant, in relation to the formation of mercury sulfate during the adsorption process. Sulfated commercial adsorbents are formed by metal sulfates. In general, these adsorbents are supported metals or metal oxides that may be pre-sulfated or sulfated in situ as described in MARKOVS, J.; CLARK, K. "Optimized mercury removal in gas plants," GPA Annual Convention Proceedings, pp. 1-18, 2005. In regard to non-regenerable adsorbents, recent studies are mentioned regarding ionic liquids supported on porous materials as adsorbents to capture mercury from combustion gases.

In natural gas (NG) processing plants, conventional mercury ($Hg^\circ$) removal units (Mercury Removal Units—MRUs), are located downstream of the water removal units. The problem is that the presence of water has a negative impact on the performance of the majority of adsorbents, causing a decrease in mechanical resistance and in accessibility of active sites due to water condensation in the pores of the adsorbents and in the adsorption capacity of the sulfated adsorbents, as described in BARTHELET, K., HUGON, A., GUILLOU, F., et al., "Global solution for mercury removal in saturated wet gas streams: from rational material design to innovative process issues," 12th International Conference on Mercury as a Global Pollutant, Halifax, Jeju, Korea, June 14-19, 2015. This has motivated the search for adsorbents that are capable of maintaining their performance when $Hg^\circ$ is removed from gas streams saturated with water, allowing installation of MRUs upstream of the other units.

Researchers BARTHELET, K., HUGON, A., GUILLOU, F., et al., in "Global solution for mercury removal in saturated wet gas streams: from rational material design to innovative process issues," 12th International Conference on Mercury as a Global Pollutant, Halifax, Jeju, Korea, June 14-19, 2015, mention the use of a water-resistant adsorbent, prepared by depositing CuS into optimized alumina. Companies established in the adsorbents market have also been working to develop adsorbents with copper-promoted alumina, in addition to already-known sulfated adsorbents and synthetic zeolite-based adsorbents, as discussed in MERCURY MARCH E-BULLETIN, Environmental Technology Online, 2015. Other authors, such as JUBIN, C.; DUCREUX, O.; in their "Challenge of front-end mercury removal for natural gas processing," 12th International Conference on Mercury as a Global Pollutant, Halifax, Jeju, Korea, Jun. 14-19, 2015, propose modifying the properties of alumina impregnated with an active phase, in order to make the adsorbent more resistant to wet conditions, and to increase accessibility of the active sites, diminishing diffusion resistance. The authors also discuss the importance of having an appropriate mathematic modeling tool to simulate the adsorption profile of Hg throughout the bed, and to help select the most appropriate adsorbent.

The complex cycle of mercury in nature, associated with its high toxicity and bioaccumulative properties, are the basis for its classification as a global pollutant, and make scientific study and environmental management of it a priority. Therefore, restrictive limits on mercury emissions have been defined by environmental entities, backed by the agreement among more than 140 countries following discussions in the Minamata Convention (2013). The Brazilian instrument for ratification has been in force in Brazil since November 2017.

Elemental mercury ($Hg^\circ$) and its compounds occur naturally in fossil fuels, such as oil, natural gas, and coal, and they are significant anthropogenic sources of mercury in the environment. Occurring in natural gas mainly in its elemental form ($Hg^\circ$), the concentrations of mercury in natural gas are in the range of 0.1-5000 $\mu g \cdot m^{-3}$, depending on the well. Despite the low concentrations, mercury is especially hazardous in natural gas processing plants because it condenses on the equipment and pipes, especially in cryogenic processes, causing corrosion and fragilization of metal structures. For example, in 1973, a failure in aluminum heat exchangers occurred in a liquefied natural gas plant, causing a serious accident in Skikda, Algiers, whose cause was attributed to mercury corrosion. It is therefore necessary for industries to stop production from time to time and clean their structures, both to minimize contamination, and as an accident-prevention policy.

In addition to the financial losses caused by production stoppages, cleaning up mercury condensate results in occupational exposure of workers to mercury contamination; the resulting disease is called hydrargyrism. Note that $Hg^\circ$ is toxic if ingested or inhaled, and 80% of inhaled vapors are retained by the organism. This vapor is odorless and colorless, and there are no exposure limits that are considered to be safe. Another concern is the fact that mercury poisons catalysts and contaminates products, which are materials with high financial value.

Natural gas has been assigned an important role in reducing greenhouse gas emissions in relation to other fossil fuels such as oil and coal. Thus it is being chosen as a fuel that will ensure the transition to an energy matrix based on sustainable energy, due to the possibility of integrating these energy resources. Therefore, atmospheric emissions from mercury in the prospecting, transport, and burning of natural gas may become significant over the long term due to the large amount of this fuel that is processed, as well as the spatial and temporal variability of mercury concentrations and the difficulties in detecting and monitoring it.

The document by CAMARGO, C. L. M. "Estudo em múltiplas escalas da sorção de mercúrio elementar gasoso em adsorventes com base em hidroxiapatita," [Multiple-scale study of sorption of gaseous elemental mercury in hydroxyapatite-based adsorbents (Doctoral Thesis), Universidade Federal do Rio de Janeiro [Federal University of Rio de Janeiro]—COPPE, 2017 is a study that investigates the mechanisms of adsorption/sorption of $Hg^0$ using experimental data that results from multiple-scale modeling. The adsorbents $Cu_xS_y$/hydroxyapatite were characterized as solid mesopores, with active sites dispersed in the calcium phosphate matrix, and as high-performance adsorbents for removal and fixation of mercury. That document does not mention the pelletizing of the adsorbents, and it does not use titanium dioxide as a precursor.

The document by REIS, P. C. "Estudo da remoção e fixação de mercúrio usando hidroxiapatitas modificadas como adsorventes específicos," [The study of the removal and fixation of mercury using hydroxyapatites modified as specific adsorbents], (Doctoral Thesis), Universidade Federal do Rio de Janeiro—COPPE, 2008, is a study on the development of specific adsorbents for removal and fixation of ionic mercury ($Hg^{2+}$) from aqueous effluents, with its differential being the high fixation capacity of the removed mercury. That study does not present results for mercury adsorption from gas streams that maintain their performance in the presence of water, it does not reference a static adsorption system, and it does not use titanium dioxide as a precursor.

Document CN107486133A refers to an adsorbent to remove mercury from natural gas, and to a method of preparation that uses sulfur and $Al_2O_3$ in its composition, and it does not present an adsorbent with a high capacity for fixation of adsorbed mercury, nor does it refer to the use of hydroxyapatite (HAp) and titanium dioxide in its process. Furthermore, it does not mention an adsorbent that is resistant to $H_2S$ poisoning, and that maintains its performance in the presence of water.

Document PI11058374A2 describes a process to produce a mercury adsorbent, emphasizing the field of petroleum engineering. The adsorbent is a magnesium silicate with aluminum and iron content, which does not mention the use of hydroxyapatite and titanium dioxide in its process, nor is there a final stabilization by calcium phosphate-based sulfated adsorbents.

Thus, no document in the state of the art reveals a mercury capture process in gas streams and final stabilization by calcium phosphate-based and titanium oxide-based sulfated adsorbents like what is presented in this invention.

The development of a better-performing adsorbent is a productivity gain in natural gas purification processes. Resistance to $H_2S$ poisoning is a first differential. In parallel to its high mercury fixation capacity, it reduces environmental liabilities and the risks involved in storing large amounts of metal mercury. The gains in relation to work safety can be determined by the preservation of the different structures and metal components that are deteriorated by mercury amalgamation.

Minimization of risks protects worker health, which are minimized by reducing the environmental liability and manipulating an adsorbent with a lower degree of toxicity. This adsorbent also represents a significant contribution to the goals of minimizing mercury emissions that are part of the new environmental regulations that refer to emitting mercury into nature.

Therefore, the development of technologies capable of removing mercury from natural gas efficiently and safety is imperative, including minimum generation of waste and minimization of the risks of re-emission.

SUMMARY DESCRIPTION OF THE INVENTION

First, it is noted that the following description will begin with preferred embodiments of the invention. As will be evident to anyone versed in the matter, however, the invention is not limited to these particular embodiments, but only to the scope of protection defined in the claims.

This invention is in relation to a process for preparing calcium phosphate-based sulfated adsorbents that capture mercury in gas streams. These adsorbents present high efficiency both for removal of low concentrations of mercury, such as in natural gas, and for stabilization of this pollutant.

From an environmental point of view, this capacity to stabilize mercury is a determining factor, because it reduces the risks of re-emission, and allows the depleted adsorbent to be handled safely. It is important to note that the regulations for correct storage and disposal of industrial waste that contains mercury are becoming increasingly restrictive, The adsorbents obtained in the invention may be used in the MRUs located at natural gas processing plants, which mercury removal units may be located either upstream or downstream of the dehydration and $H_2S$ removal units, due to the adsorbent obtained showing resistance to $H_2S$ poisoning and maintaining its performance in the presence of water.

BRIEF DESCRIPTION OF THE DRAWINGS

The present invention will be described in greater detail below, referencing the attached figures, which clearly and without restriction of the inventive scope, provide examples of its realization. The designs show.

DETAILED DESCRIPTION OF THE INVENTION

The process of this invention for preparing calcium phosphate-based sulfated adsorbents that capture mercury in gas streams, comprises three steps:
  a) Synthesis of the precursors, which are: hydroxyapatite (HAp) and titanium oxide ($TiO_2$);
  b) Incorporation of a transition metal into the adsorbent, using either copper or zinc;
  c) Sulfation of the material.

HAp, $TiO_2$ and a physical mixture of the two (50% and 50%) were used as precursors.

Figure 5:
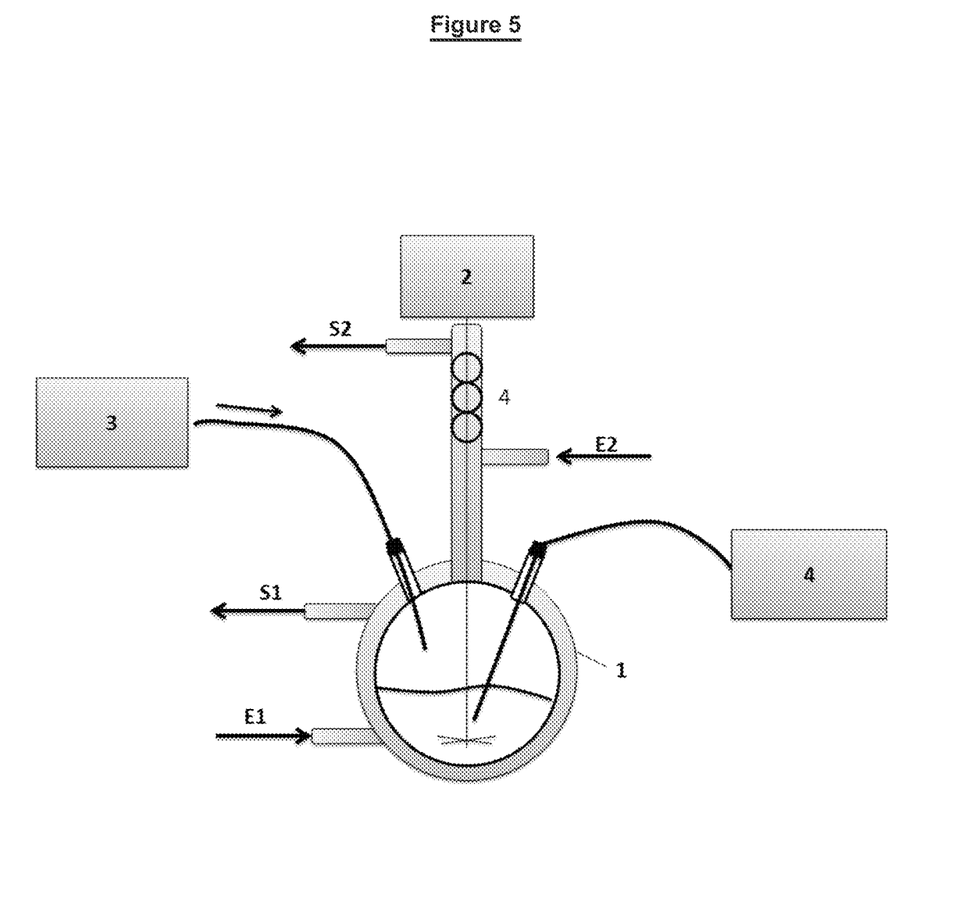
FIG. 5 shows a layout representing hydroxyapatite preparation: 1. A three-way flask, initially with a solution of $(NH_4)2HPO_4$; 2. Mechanical agitator (250 rpm); 3. Peristaltic pump for introducing the $Ca(NO_3)_2:4H_2O$ solution into a flow of 2.5 mL/min; 4. pH meter and introduction of $NH_4OH$ to keep the pH in the range of 10 to 11; 5. Condenser. E1: water entry at 80° C. and entry of cooling fluid at 5° C.; S1 and S2: water outflow.

The hydroxyapatite was prepared using the direct precipitation method in a three-way flask, as shown in FIG. 5.

The titanium dioxide ($TiO_2$) was prepared through slow hydrolysis of the titanium isopropoxide. Due to the instability of the reagent, the reaction was realized in an inert atmosphere, using a plastic chamber that had been previously filled with $N_2$.

The adsorbents with pure hydroxyapatite as their basis were incorporated using content of up to 7% copper using the ionic exchange method, as described in CAMARGO, C. L. M., SALIM, V. M. M., TAVARES, F. W.; RESENDE, N. S. "Phenomenological modeling for elemental mercury capture on hydroxyapatite-based adsorbents: An experimental validation." Fuel (Guildford), v. 225, pp. 509-518, 2018.

For the hydroxyapatite-based and titanium dioxide-based adsorbents, higher metal content (20% Zn and 8% Cu) was incorporated by dry impregnation. The adsorbents developed are described below:
  Zn,Cu/HAp: the zinc was incorporated into the precursor (HAp) via dry impregnation by adding a solution of $Zn(NO_3)_2(aq)$ with a sufficient quantity of metal (final theoretical content: 20% Zn/HAp). After calcination at a temperature of 350° C., the resulting solid was again submitted to dry impregnation using a solution of $Cu(NO_3)_2(aq)$ to incorporate the copper, in which the final theoretical content was 20% Zn, 8% Cu/HAp;
  Zn,Cu/(HAp+$TiO_2$): the same procedure was used, replacing the HAp precursor with a physical mixture of HAp-$TiO_2$, in which the final theoretical content was 20% Zn, 8% Cu/(HAp-$TiO_2$);
  (Zn+Cu)/HAp: the dry impregnation method was performed in a single step, in which the solution containing sufficient quantities of the metals was incorporated into the precursor (HAp) in a single addition, in which the final theoretical content was 20% Zn, 8% Cu/(HAp).

In all cases excess metal 3% (w/w) was used. The samples were calcinated at a temperature of 350° C. for two hours at a rate of 10° C./min between the addition of each metal, and at the end of the addition.

Figure 6:
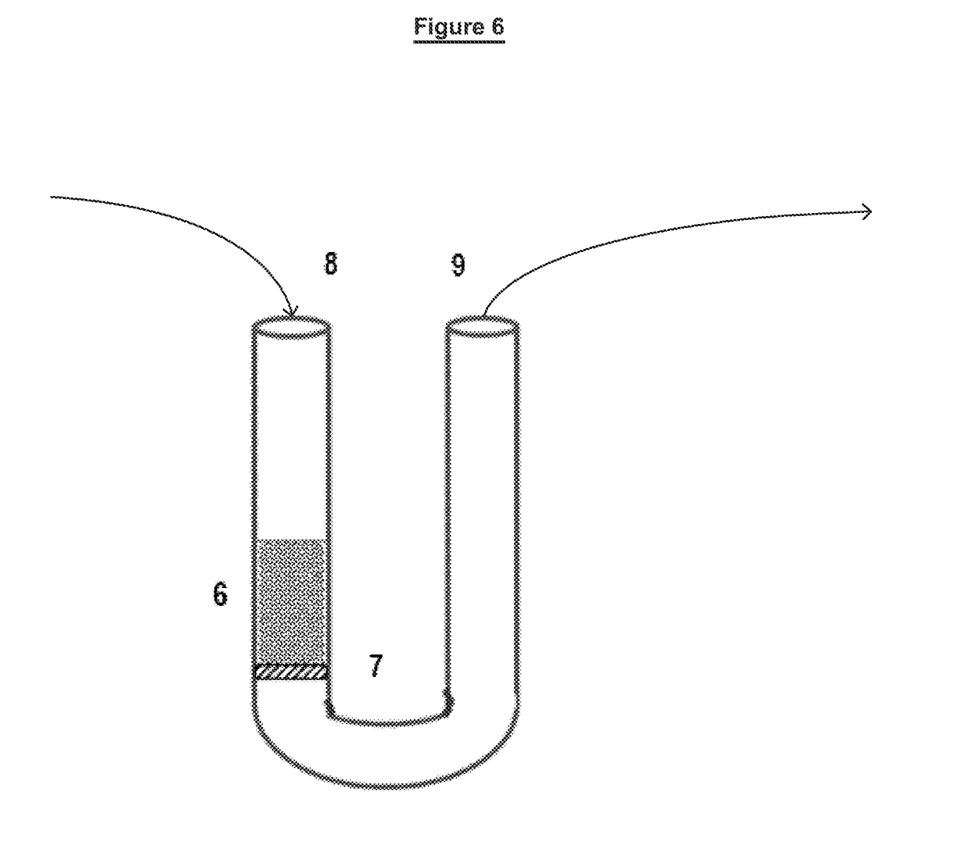
FIG. 6 shows a layout of hydroxyapatite preparation—Adsorbent sulfation system: 6. Adsorbent mass; 7. Glass wool; 8. Gas inflow (5% $H_2S$/He); 9. Gas outflow.

After modification with the transition metal(s), the samples were placed in a U-shaped reactor, which was positioned in the sulfation system as shown in FIG. 6, comprised of a Pyrex glass micro reactor, jacketed oven, $H_2S$ temperature and valve controller equipped with a DCT detector adequate for quantification of consumption of $H_2S$. The samples were pre-treated at 200° C., at a heating rate of $10°$ $C.·min^{-1}$ for two hours under a helium flow (50 $mL·min^{-1}$) for removal of physisorbed water. Next the samples were sulfated by passage of the mixture 5% (v/v) $H_2S$/He (50 $mL·min^{-1}$) at different ambient temperatures or 350° C.

The specific surface of the adsorbents (SBET) was determined using the BET method, from data obtained by adsorption of $N_2$ at 77K using commercial equipment. The chemical composition and the calcium and phosphorous ratio (Ca/P) of the samples were determined using X-ray fluorescence analysis (XRF) using a source of ruthenium to generate X-rays. X-ray diffraction analysis (XRD) was used to identify and determine the morphology, purity, and structure of the solids in the different steps of the invention, and the measurements are taken using CuKα radiation generated at 30 kV and 15 mA.

Figure 7:
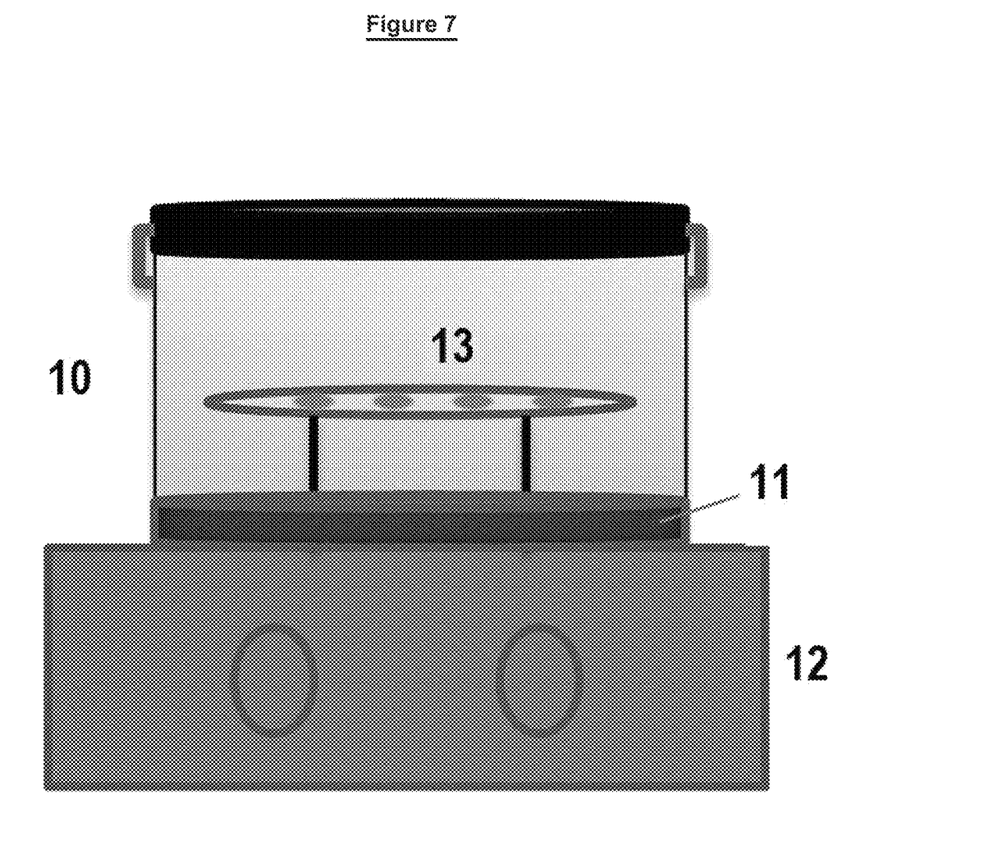
FIG. 7 shows a static batch adsorption system: 10. Sealed glass recipient; 11. Liquid mercury bed; 12. Magnetic agitator; 13. Support with adsorbent samples exposed to an atmosphere saturated with Hg.

In static tests, samples of the adsorbents were exposed to an environment saturated by mercury in its vapor phase. The static system shown in FIG. 7 comprises a sealed glass recipient, which allows exposure of adsorbent samples to a vapor that has been saturated by mercury. This system allows a larger opening for placement of the base of the samples and agitation of the mercury bed (45 mL), which is done with the help of a magnetic agitator, which results in better homogenization of the mercury concentration in the vapor phase. This system contains a glass support that allows simultaneous evaluation of a larger number of adsorbent samples (5 samples) in relation to System 1 (3 samples). The base is moveable and easy to handle, in order to facilitate introduction and removal of the adsorbent samples.

The mercury content was determined in the solids at the end of the adsorption process in a mercury analyzer with a specific pyrolysis accessory coupling that conducts pyrolysis of the samples.

Figure 8:
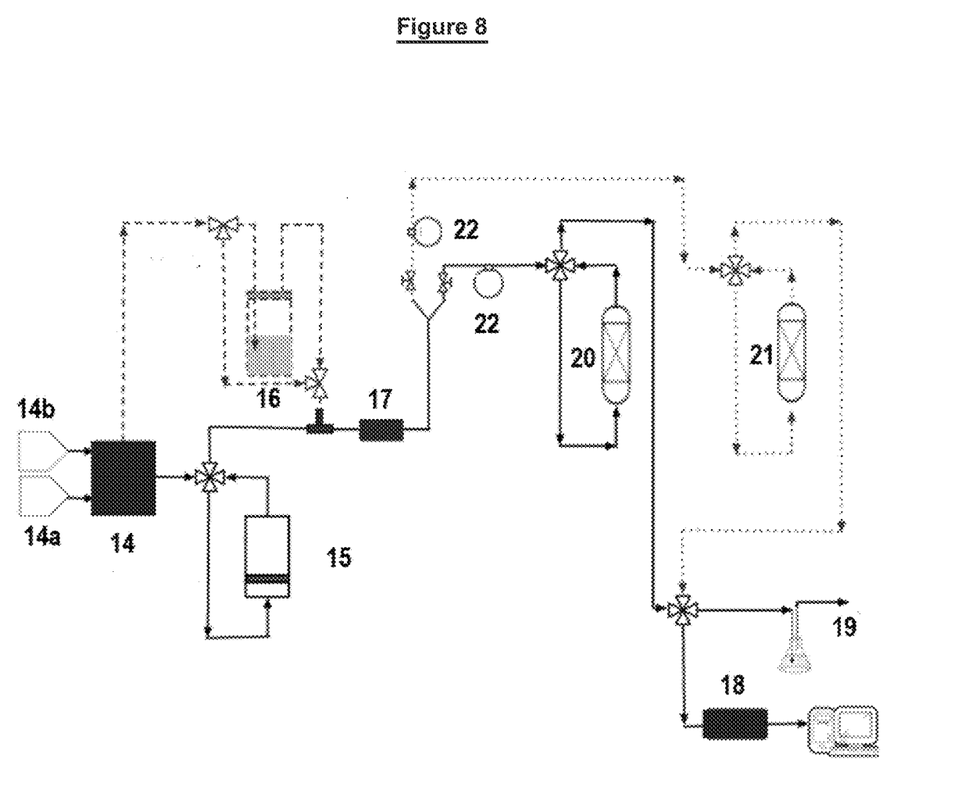
FIG. 8 shows a dynamic mercury adsorption system in gas streams: 14. Gas flow controller; 14a. Methane inflow; 14b. Nitrogen inflow; ($N_2$), 15. Hg saturator; 16. $H_2O$ saturator; 17. Gas mixer; 18. Hg analyzer; 19. Exhaust; 20. Reactor R-1 (fixed bed string); 21. Reactor R-2 (fixed bed string); 22. FM: flow meters.

The dynamic adsorption system enables dynamic mercury removal in an adsorption fixed bed in the system presented in FIG. 8 to be evaluated. The concentrations of Hg at the entry and exit from the reactor were monitored with the aid of an online $Hg^0$ analyzer. The concentrations measured at the exit from the bed (normalized by the entry concentration) versus time of adsorption, allowed the characteristic rupture curves of each run to be constructed.

The system was built so that water could be inserted into the $Hg^0$-contaminated gas stream with parallel test performance, enabling simultaneous evaluation of the performance of the adsorbents, as shown in FIG. 8. The concentrations of $Hg^0$ and water are controlled by the temperature from the saturators and the gas stream flows from each line.

The stability and fixation tests were run in the same unit where the fixed-bed adsorption tests were done. At the end of the adsorption tests, the adsorbents were subjected to different temperatures, while the carrying gas percolated the reactor. Prior to this step, the solids used in the batch adsorption tests were thought to increase their granulometry, in order to prevent preferred pathways of the carrier gas. The heating rate was 10° C./min and the gas flow was 17 mL/min to a solid mass of 0.15 g, maintaining the same relationship between the flow and the solid mass used in the adsorption tests.

Figure 9:
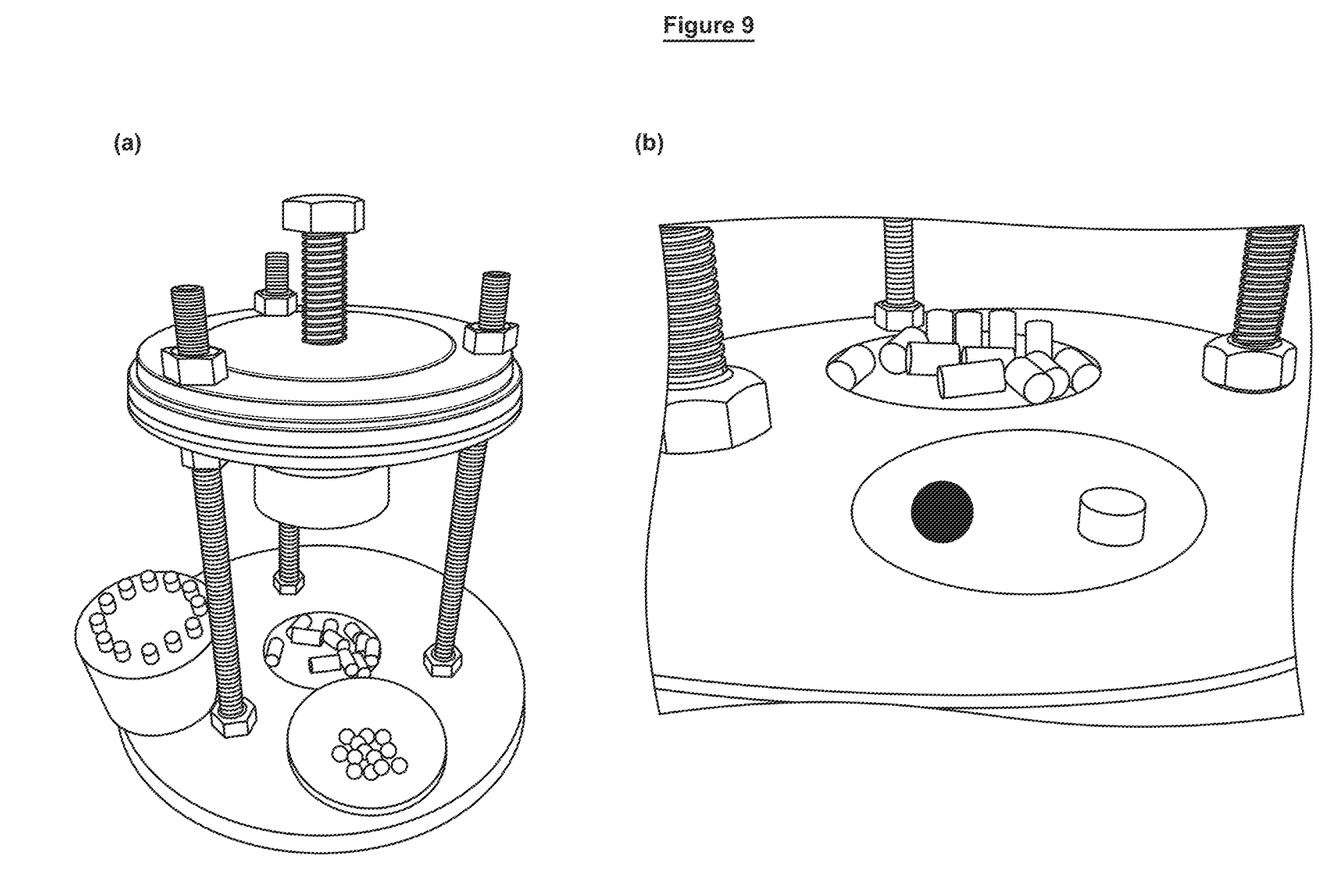
FIG. 9 shows a pelletizer (a) and visualization of the size of the pellet produced; (b) (white particle) with reference to the spheric particle of the commercial adsorbent (black particle).

A system for pelletizing samples was designed and tested, enabling comparative tests in conditions analogous to those of commercial adsorbents. Together with the pelletizer, new reactors with larger dimensions were created in order to hold the commercial samples that were provided in varying particulate sizes. The pelletizer that was developed, and the samples that were pelletized are shown in FIG. 9.

In their composition, the sulfated adsorbents obtained with pure hydroxyapatite present the incorporation of zinc content ranging from 1 to 30% w/w and of copper content from 1 to 15% w/w, preferably with incorporation of zinc content of 20% w/w and copper content of 8% w/w.

The sulfated adsorbents obtained by the physical mixture of the composition that is 50% w/w of hydroxyapatite and 50% w/w titanium dioxide, present the incorporation of zinc content from 1 to 30% w/w, and of copper content from 1 to 15% w/w, preferably with incorporation of zinc content of 20% w/w and copper content of 8% w/w.

The adsorbents obtained present the following advantages in relation to other commercial adsorbents or from the literature, which state that they are highly promising for the growing market for alternatives for mercury removal and decontamination:

The adsorbent presents high adsorbed mercury fixation capacity. Identification of the stable compound HgS and the profile of desorption of Hg prove the high fixation of the mercury in the patentable material. The adsorbent stabilizes the structure of the mercury, interrupting the cycle of capture and re-emission, and it diminishes the industrial liability in storage in the form of metal mercury and/or the exhausted mercury;

The adsorbent presents high performance for mercury capture in streams with low concentrations of the pollutant. After modifications to its structure, the apatite used as the precursor matrix presents the capacity to efficiently remove elemental mercury from gas streams, even when the mercury is present in low concentrations, such as in natural gas. This is an important property for guaranteeing that the specifications are complied with and the restrictive limits for mercury emissions met;

The adsorbent is resistant to $H_2S$ poisoning. In a natural gas processing plant, the MRUs (Mercury Removal Units), are preferably located upstream of the other units, protecting the other units from mercury corrosion. $H_2S$, which is a contaminant generally present in significant quantities in natural gas, may poison adsorber beds, decreasing the useful life of the adsorbent. One advantage of the developed material is to present a metal sulfate as an active phase, and which is therefore resistant to $H_2S$ poisoning;

The adsorbent maintains its performance in the presence of water. The mesoporosity of the adsorbent is an important property for the process because it facilitates the intraparticle transport of the mercury, and inhibits the capillary condensation of water present in natural gas, which has been reported as one of the most frequent problems in using zeolites as support.

EXAMPLES

The following tests were performed in relation to this invention, which contain examples of embodiments of this invention.

Apatites modified with transition metals by ionic exchange (up to 7%) and hydroxyapatite (HAp) supports and/or titanium oxide (TiO2) impregnated with high metal content (3 to 25%) and sulfated, were prepared, characterized and tested in static and dynamic adsorption systems.

Decontamination of mercury from natural gas is a process that has already been implemented in the industries that use natural gas as a basic input. Experimental systems allow performance of the adsorbents obtained in conditions similar to those seen in the field to be evaluated. The mathematic model of the process was developed, which was capable of describing the experimental data in different process conditions. Finally, a solution for producing the adsorbent's pellets was developed and tested, and the technology is ready for large-scale production.

Furthermore, the adsorbent's performance was also evaluated in the presence of water (0.026 kgH$_2$O/kgGN). Despite formation of a new phase of $HgSO_4$ in the exhausted adsorbent, which was identified using Raman spectroscopy, the performance of the calcium phosphate adsorbents was not impacted by the presence of water. This is quite a significant finding, which is correlated to the chemical nature of apatite used to disperse the active phase and by the adjustment of its textural properties.

The hydroxyapatite was prepared using the direct precipitation method in a three-way flask. First, 150 mL of a 0.3 M ammonium phosphate dibasic solution was added to the flask. Next, 150 mL of a 0.5 M calcium nitrate solution and 75 mL of copper nitrate were added slowly (1.7 and 0.8 mL/min, respectively), with the aid of a peristaltic pump. Before the addition, the pH of the solutions was adjusted to values between 10 and 11 by adding ammonium hydroxide. During the addition, the pH of the mixture was monitored and adjusted with ammonium hydroxide, under constant magnetic agitation, and the temperature was kept at 80° C. (±5° C.), with the aid of a heating bath. A ball condenser was used and kept at a temperature of 5° C. (cooling bath), on the pathway of the mechanical agitator, to prevent the loss of volatiles. At the end of the addition, the mixture remained in the same conditions of temperature and agitation for two hours. After this aging time, the mixture was hot-filtered in a paper filter with the aid of a Buchner funnel, and the material retained was hot-washed until the pH of the washing water attained the value of 7. The solid was then dried in an oven (100° C.) for 24 hours and calcinated at 300° C. (heating rate of 10° C.·min$^{-1}$) for two hours under constant air flow (50 mL·min$^{-1}$).

The titanium dioxide ($TiO_2$) was prepared through slow hydrolysis of the titanium isopropoxide. Due to the instability of the reagent, the reaction was realized in an inert atmosphere, using a plastic chamber that had been previously filled with $N_2$.

Hydroxyapatites were modified with content of up to 7% copper using the ionic exchange method, in which 4 g of HAp was suspended in a solution of 0.1378 M of copper nitrate (1.6650 g of the salt in 50 mL of water). The excess salt (around 40%) was used to incorporate the copper ions into the structure of the hydroxyapatite. The suspension was agitated constantly (250 rpm) for four hours. At the end of this time, the suspension was filtered and the retained solid was dried in an oven (100° C.) for 24 hours and calcinated at 300° C. (heating rate of 10° C.·min$^{-1}$) for two hours under constant air flow (50 mL·min$^{-1}$).

Higher metal content (20% Zn and 8% Cu) was incorporated by dry impregnation and the adsorbents developed are described below:

Zn,Cu/HAp: the zinc was incorporated into the precursor (HAp) via dry impregnation by adding a solution of $Zn(NO_3)_2$(aq) with a sufficient quantity of metal (final theoretical content: 20% Zn/HAp). After calcination (350° C.), the resulting solid was again submitted to dry impregnation using a solution of $Cu(NO_3)_2$(aq) for incorporation of the copper (final theoretical content: 20% Zn, 8% Cu)/HAp);

Zn,Cu/(HAp+TiO2): the same procedure was used, replacing the HAp precursor with a physical mixture of HAp-TiO2 (final theoretical content: 20% Zn, 8% Cu)/(HAp-TiO2));

(Zn+Cu)/HAp: the dry impregnation method was performed in a single step: a solution containing sufficient quantities of the metals was incorporated into the precursor (HAp) in a single addition (final theoretical content: 20% Zn, 8% Cu)/HAp);

In all cases excess metal of 3% (w/w) was used. The samples were calcinated (350° C., 2 h, 10° C./min) between the addition of each metal and at the end of the addition.

After modification with the transition metal(s), the samples were placed in a U-shaped reactor, which was positioned in the sulfation system, comprised of a Pyrex glass micro reactor, jacketed oven, $H_2S$ temperature controller and valve regulator equipped with a DCT detector adequate for quantification of $H_2S$ consumption. The samples were pre-treated at 200° C. (heating rate of 10° C.·min-1) for two hours under a helium flow (50 mL·min$^{-1}$) in order to remove physisorbed water. Next the samples were sulfated by the passage of the mixture 5% (v/v) $H_2S$/He (50 mL·min-$^1$) at different ambient temperatures or 350° C.

Example 1: Batch Adsorption Tests

The adsorbents modified using the ionic exchange method were characterized as mesoporous materials with high specific surface (38-72 m$^2$/g), based on non-stoichiometric hydroxyapatite modified with content of up to 5.36% of copper and sulfates.

Figure 1:
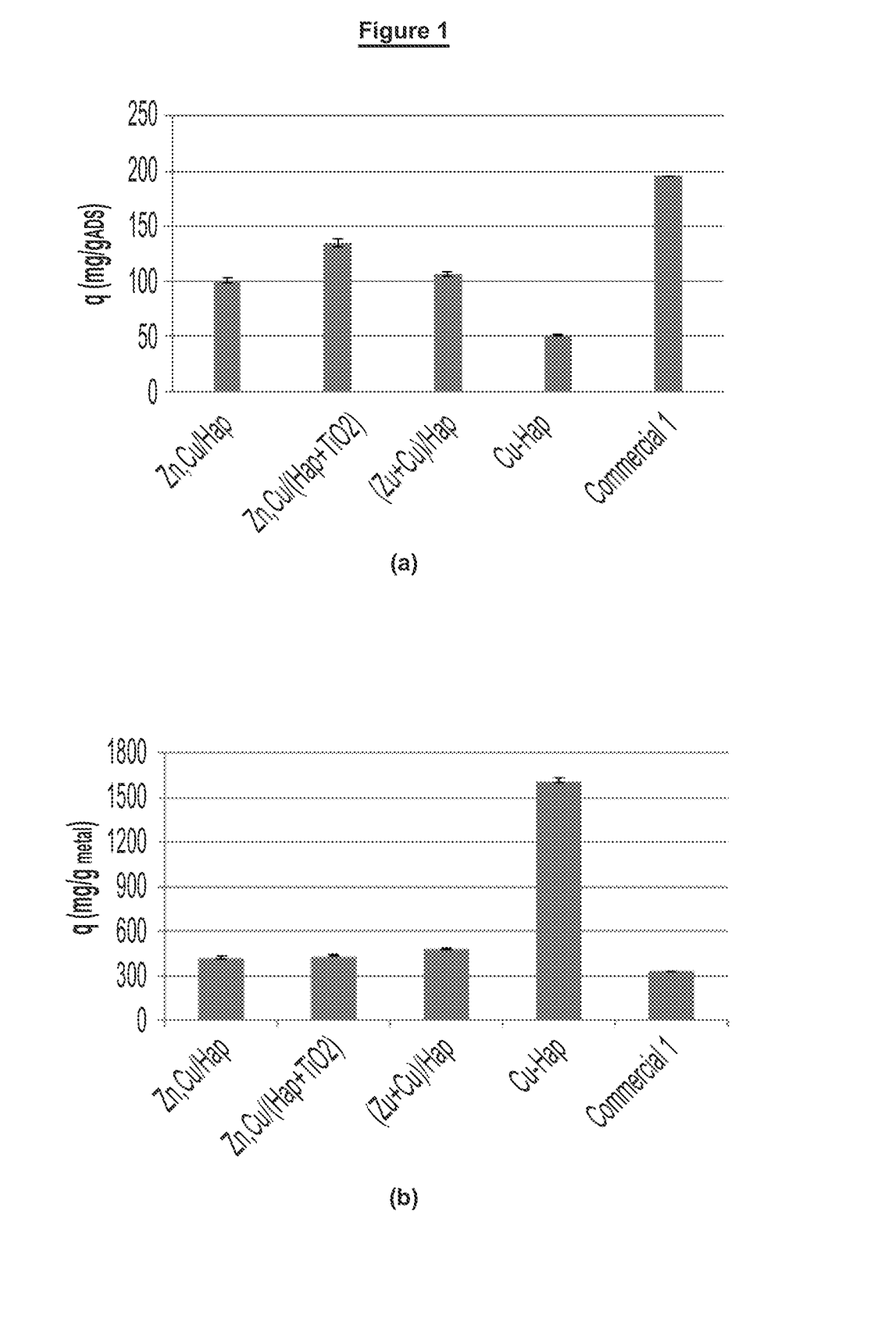
FIG. 1, showing Hg content in the samples of hydroxyapatite-based (HAp) adsorbents modified with zinc and copper (Zn,Cu/HAp and Zn+Cu/HAp) and just with copper (Cu/HAp), and HAp- and titanium oxide-based ($TiO_2$), modified with zinc and copper, (Zn,Cu/HAp+TiO2), and from a commercial adsorbent at the end of the batch adsorption tests by total mass of adsorbent (a) and by the mass of the incorporated transition metal (b)

The average values for mercury removal capacity determined in the static adsorption system are shown in Table 1 and in FIG. 1. Table 1 shows the results for the samples of the adsorbents with pure hydroxyapatite (HAp) as the base, and with content of 1.17%, 3.18%, and 5.36% (w/w) copper incorporated by ionic exchange. The results were reproduced using duplicate samples, and the adsorption capacity was proportional to the copper content incorporated into the hydroxyapatite.

TABLE 1

Results of the batch adsorption tests in System 1.

| Adsorbent | Removal capacity (mg/g) |
|---|---|
| HAp | 3.68 |
| 1.17% Cu/HAp | 33.68 |
| 3.18% Cu/HAp | 34.38 |
| 5.36% Cu/HAp | 73.21 |

The results for the adsorbents with hydroxyapatite and titanium dioxide as the base and with higher metal content (20% Zn and 8% Cu) incorporated via dry impregnation are shown in FIG. 1. Among the adsorbents developed, Zn,Cu-(HAp+TiO$_2$) presented greater capacity for mercury removal, as shown in FIG. 1a. When normalized by the quantity of metal that may be sulfated, which was obtained using XRF analysis, the adsorbent with the best mercury removal performance is Cu-HAp, modified by ionic exchange, as shown in FIG. 1b.

In thermal stability tests, it was proved that there is not significant removal of mercury from the exhausted adsorbent at temperatures of 95° C., proving the high fixation of mercury through the adsorbents obtained. After finalizing the batch adsorption test, XRD was used to identify the presence of a new phase of mercury sulfate or synthetic metacinnabar (HgS) in the exhausted adsorbent, which is a compound with low solubility and high stability, as described in CAMARGO, C. L. M., RESENDE, N. S., OLIVEIRA, A. G, SALIM, V. M. M., TAVARES, F. W., "Investigation of adsorption-enhanced reaction process of mercury removal from simulated natural gas by mathematical modeling," Fuel (Guildford), v. 129, pp. 129-137, 2014.

The batch adsorption tests (static tests) allowed a comparison to be made between the performance and screening of adsorbents for removal of the gaseous elemental mercury. The results showed that the performance of the adsorbents was proportional to the metal content, even with drastic changes in their textural properties. It was also confirmed that copper sulfate ($Cu_xS_y$) is the active phase of this adsorbent, and that its sulfation temperature does not have an expressive influence on adsorbent performance. The results of the physical and chemical characterization, in particular, from the X-Ray Fluorescence Analysis (XRF), showed that the flexible structure of the hydroxyapatite enabled incorporation by the wet pathway of up to approximately 7% transition metals in its crystalline matrix. X-Ray Diffraction Analysis (XRD) showed that there was not a significant alteration with modification with metals. The physisorption analysis of $N_2$ at 77K showed that the adsorbent presents a high specific area 40-70 m$^2$/g, which is an important property from the viewpoint of accessibility of sites and minimization of the limitations of mass transfer. Analysis of thermal conductivity analysis (TCA) enabled consumption of $H_2S$ to be monitored during the adsorbent's sulfation step. With this information, the stoichiometric Cu/S ratio of 1.35 to 1.76 was determined, indicating the presence of a mixture of $Cu_2S$ (chalcocite) and CuS (covellite).

Overall, the results of the static tests pointed to adsorbents with adsorption capacity higher than that of commercial adsorbents, regardless of the textural properties and of the type of precursor, and directly related to the metal content of the adsorbents. The use of HAp as a precursor therefore increases the adsorbent's stability, which justifies its use considering the need to store it prior to the adsorption tests.

Example 2: Dynamic Adsorption Tests

The dynamic of removal of the tests using hydroxyapatites modified with copper via ionic exchange, sulfated, was compared to the analogous results of a commercial adsorbent. The operating conditions of the tests used in this study are described in Table 2.

Figure 2:
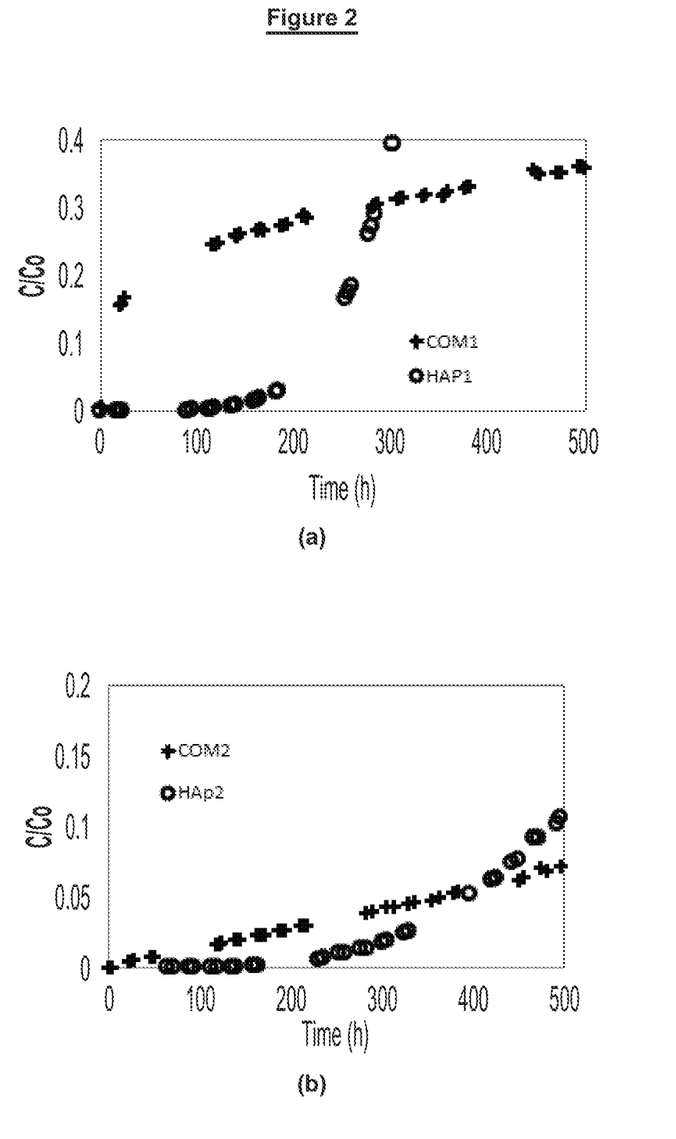
FIG. 2 shows a comparison between the rupture curves of the tests, using the pure hydroxyapatite-based (HAp) adsorbents modified with copper content of 5.4% (HAP1) and 4.8% (HAp2), and the commercial adsorbents (COM1 and COM2) in the smaller beds (a) and in the larger beds (b)

The rupture curves for the tests that use the hydroxyapatite-based (HAp) adsorbent and the commercial adsorbent are shown in FIG. 2. For smaller beds, the adsorbent developed is more efficient in mercury removal in the first 300 hours of testing, and is the most reliable for keeping concentration at the exit point of the bed below 30% of the entry concentration value. For larger beds, it is shown that the HAp-based adsorbent is also the most efficient in the first 400 hours of testing.

The results show that the adsorbent is capable of maintaining the rigid specifications for mercury concentration at the outflow from the bed.

Therefore, the adsorption tests in the adsorption system in a fixed bed enable the adsorption dynamic to be monitored and the performance between the adsorbent developed and the commercial adsorbents to be compared. In these tests, the simulated natural gas ($CH_4+Hg^0$) percolates the bed, while the concentrations of mercury at the inlet to and the outlet from the bed, are monitored over time. Despite having much lower metal content (8%) in their composition in relation to the commercial adsorbents (55%), the sulfated calcium phosphate-based adsorbents developed here performed better than commercial adsorbents in maintaining low exit concentrations (concentration at the outlet below 3% concentration at the entry of 10 ng/mL).

TABLE 2

Characteristics of fixed-bed adsorption systems.

| VARIABLES | HAp 1 | HAp 2 | COM 1 | COM 2 |
|---|---|---|---|---|
| Adsorbent | $Cu_xS_y$-HAp | | Commercial adsorbent | |
| Method for modification with metal | Ionic exchange | | — | |
| Metal content | 5.4% | 4.8% | 55% | |
| Mass of adsorbent (g) | 0.250 | 0.500 | 0.242 | 0.510 |
| Height of the reactor (cm) | 0.5 | 1 | 1 | 1.5 |
| Diameter of the reactor (cm) | 1 | | 1 | |
| Temperature of the reactor (° C.) | 28 | | 28 | |
| Carrier gas | $CH_4$ | | $N_2$ | |
| Gas flow (mL/min) | 30 | | 30 | 64 |
| Concentration of Hg at the reactor's entry (ng/mL) | 12.5 | | 11.8 | 7.8 |

Example 3: Phenomenological Model

Figure 3:
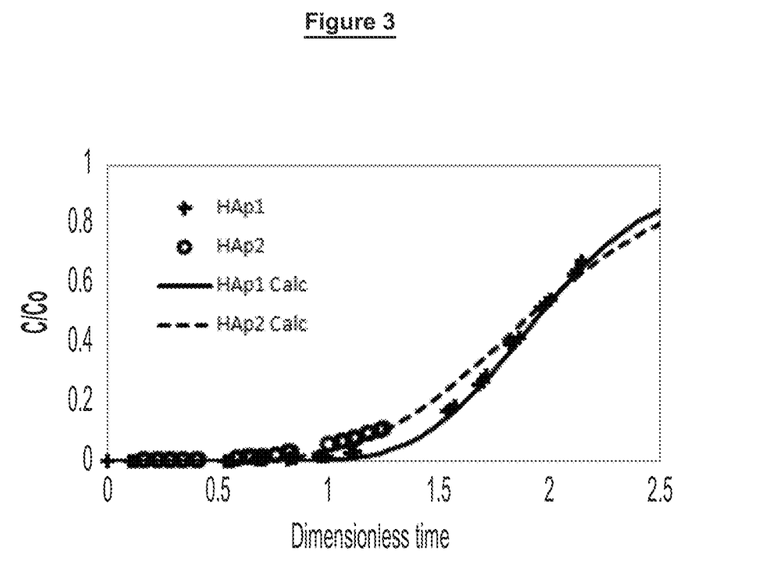
FIG. 3 shows a comparison between the experimental rupture curves (HAp1 and HAp2) and the calculated rupture curves (HAp1 Calc and HAp2 Calc) of the tests using hydroxyapatite-based adsorbents modified with copper content of 5.4% (HAP1) and 4.8% (HAp2), using dimensionless time.

The adjustment of the phenomenological model of the process from the references CAMARGO, C. L. M., SALIM, V. M. M., TAVARES, F. W.; RESENDE, N. S. "Phenomenological modeling for elemental mercury capture on hydroxyapatite-based adsorbents: An experimental validation," Fuel (Guildford), v. 225, pp. 509-518, 2018 and CAMARGO, C. L. M., RESENDE, N. S., OLIVEIRA, A. G, SALIM, V. M. M., TAVARES, F. W., "Investigation of adsorption-enhanced reaction process of mercury removal from simulated natural gas by mathematical modeling," Fuel (Guildford), v. 129, pp. 129-137, 2014, to the dynamic mercury adsorption data using the adsorbents obtained, are shown in FIG. 3. The results from the simulations using this model show two points that are considered to be very important to the invention: 1) Reproducibility of the tests: using dimensionless time, it is seen that the large difference between the experimental curves in FIG. 2 is a consequence of the increased the size of the bed; 2) the reliability of the model: the proposed model is capable of predicting the behavior observed in experiments for the larger beds, with a single set of estimated parameters (corrected by the value of the modified variable).

Example 4: Dynamic Adsorption Tests in the Presence of Water

Figure 4:
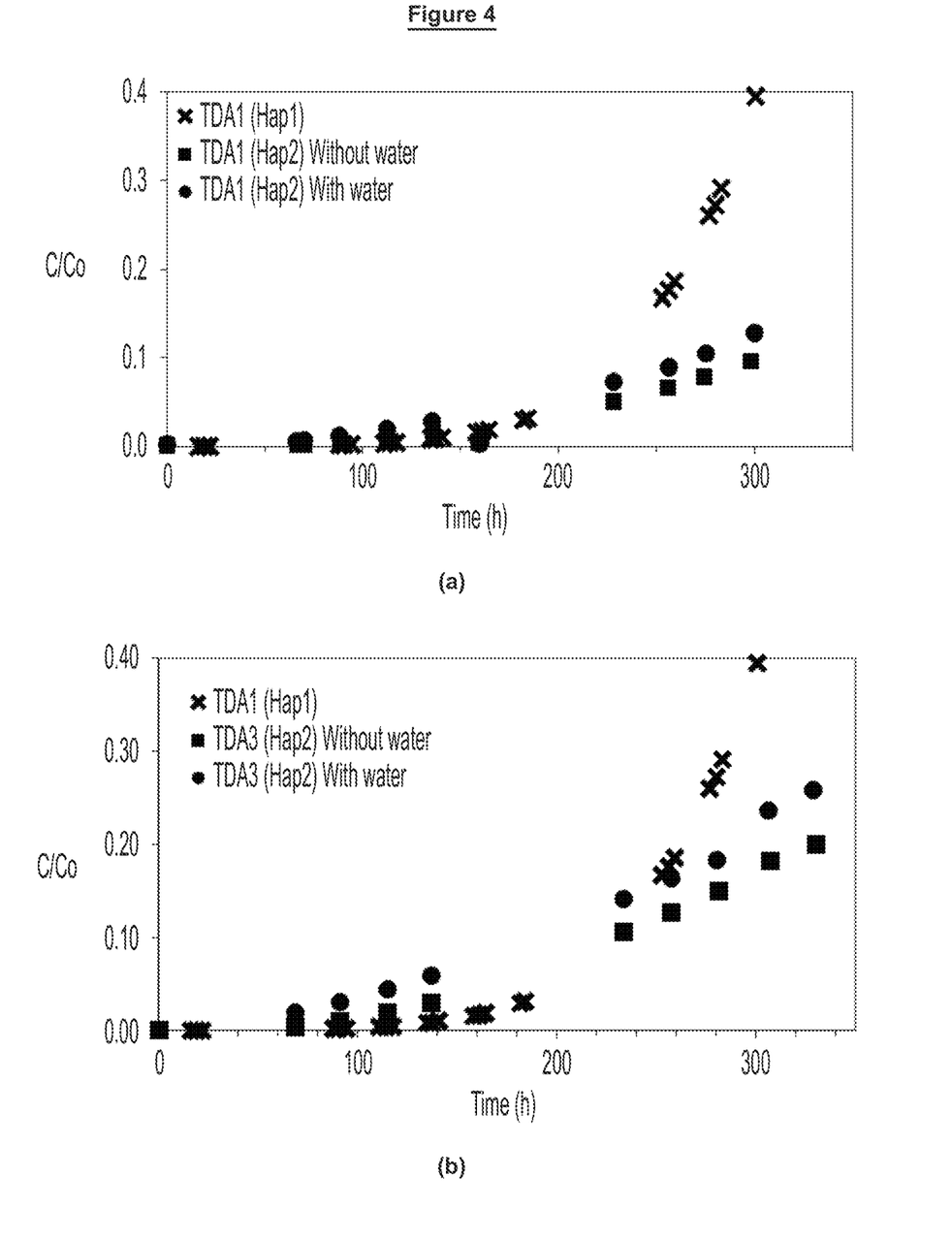
FIG. 4 shows rupture curves obtained in fixed-bed adsorption tests using hydroxyapatite-based (HAp) adsorbents modified with copper content of 5.4% (HAp1) and 4.8% (HAp2) with and without the presence of water.

Different dynamic adsorption tests (TDA-1, TDA-2, TDA-3) were run to evaluate the influence of the presence of water on the gas stream in performance of the adsorbents. The operating conditions of the other tests are described in Table 3. The rupture curves in the presence and in the absence of water are compared in FIG. 4.

The set of experimental results presented herein shows performance similar to that of the adsorbents in gas streams with or without water, showing that the adsorbent developed does not present significant modifications in its structure in the presence of water. The adsorption capacity values through pyrolysis are compared in Table 4. Note that similar values of mercury content in the exhausted adsorbent were obtained, ratifying the indication that water does not have a harmful effect on the performance of the adsorbent developed.

Example 5: Stability of Mercury in the Exhausted Adsorbent

The quantities of mercury in the exhausted adsorbent before and after the desorption test (thermal stability) are shown in Table 5. As can be seen, there is no significant difference between the content of Hg in the solid before and after desorption.

XRD characterization of the exhausted adsorbent verified the formation of a new phase of mercury sulfate or synthetic metacinnabar (HgS). Identification of the formation of this compound (HgS), [is] the product of the reaction between the mercury removed and the sulfur present in the solid, whose physical and chemical characteristics involve low solubility and high stability. From an environmental point of view, stabilization of mercury in the adsorbent is a determining characteristic, as it reduces the risks of re-emission and allows the adsorbent used to be handled safely, especially in regard to compounds with high toxicity, such as mercury.

TABLE 3

Operating conditions of dynamic adsorption tests (TDA1, TDA2 and TDA3) in the presence and absence of water

| VARIABLES | | TDA1 (HAp1) without water | TDA2 (HAp2) Line 1 with water | TDA2 (HAp2) Line 2 without water | TDA3 (HAp2) Line 1 with water | TDA3 (HAp2) Line 2 without water |
|---|---|---|---|---|---|---|
| Adsorbent | | | $Cu_xS_y$-HAp | | | |
| Method for modification with metal | | | Ionic exchange | | | |
| Metal content (%) | | 5.4 | | 4.8 | | |
| Mass of adsorbent (g) | | 0.250 | 0.249 | 0.249 | 0.252 | 0.249 |
| Height of the reactor (cm) | | 0.5 | 0.5 | 1.2 | 0.5 | 0.5 |
| Diameter of the reactor (cm) | | | | 1 | | |
| Temperature of the reactor (° C.) | | | | 28 | | |
| Carrier gas | | | | $CH_4$ | | |
| Gas flow ($CH_4$ + $Hg^0$)(mL/min) | | 30 | 31.00 | 30.34 | 30.1 | 30.4 |
| Temperature of the Hg saturator (° C.) | | 17.0 | 23.0 | 15.0 | 22.9 | 14.7 |
| Hg concentration (ng/mL) | at the exit from the saturator | 11.97 | 10.67 | 10.96 | 10.79 | 11.00 |
| | at the entry of the reactor | 11.97 | 10.67 | 10.96 | 10.79 | 11.00 |
| Temperature of the water saturator (° C.) | | — | 20.0 | — | 20.0 | — |
| Water content (ng/mL) | at the exit from the saturator | — | 9500 | — | 9500 | — |
| | at the entry of the reactor | — | 4750 | — | 4750 | — |

*Line without water: use of molecular screen, Zeolite 5A, 3.2 mm in pellets, and silica.

TABLE 4

Hg content in the exhausted adsorbents

| TEST | With water | Without water |
|---|---|---|
| TDA2 | 28.69 ± 0.25 | 29.13 ± 0.34 |
| TDA3 | 44.84 ± 1.70 | 49.87 ± 2.83 |

TABLE 5

Hg content in the exhausted adsorbent. Estimated using the rupture curve and the results of pyrolysis of the Thermal Stability Test (after adsorption and desorption).

| | After adsorption | After desorption |
|---|---|---|
| Hg content in the solid used ($mg_{Hg}/g_{ADS}$) | 11.81 ± 0.86 | 11.80 ± 0.86 |

It should be noted that although the present invention has been described in relation to the attached drawings, it may be modified and adapted by those versed in the matter, depending on the specific situation, but remaining within the inventive scope defined herein.

The invention claimed is:

1. A process for preparing sulfated adsorbents, comprising:
   a. synthesizing precursors;
   b. incorporating 3 to 25% of transition metals in the synthesized precursors via dry impregnation, calcination at 350° C. occurring in two steps;
   c. Pre-treating the product of step b at 200° C. with a heating rate of 10° C./min for 2 hours under a flow of inert gas; and
   d. sulfating the resulting adsorbent by passage of the mixture of 5% w/w $H_2S$/inert gas at ambient temperature;
   wherein the precursors are hydroxyapatite (HAp), titanium dioxide, or a physical mixture thereof;
   wherein the hydroxyapatite (HAp) is synthesized by direct precipitation; and
   wherein the titanium dioxide is synthesized by slow hydrolysis of titanium isopropoxide in an inert atmosphere.

2. The process of claim 1, wherein the precursors are hydroxyapatite (HAp) or a physical mixture of 50% w/w HAp and 50% w/w titanium dioxide.

3. The process of claim 1, wherein the transition metals are zinc and copper.

4. The process of claim 1, wherein dry impregnation occurs in a single step.

5. The process of claim 1, wherein the sulfation step occurs at a temperature of 350° C.

6. Sulfated adsorbents obtained by the process of claim 1, wherein the sulfated adsorbents are comprised of hydroxyapatite, with incorporation of zinc content from 1 to 30% w/w and copper content from 1 to 15% w/w.

7. The sulfated adsorbents of claim 6, wherein the sulfated adsorbents are comprised of hydroxyapatite, with incorporation of zinc content of 20% w/w and copper content of 8% w/w.

8. Sulfated adsorbents obtained by the process of claim 1, wherein the composition of the sulfated adsorbents is 50% w/w hydroxyapatite and 50% w/w titanium dioxide, in a physical mixture, with incorporation of zinc content from 1 to 30% w/w and copper content from 1 to 15% w/w.

9. The sulfated adsorbents of claim 8, wherein the composition of the sulfonated adsorbents is 50% w/w hydroxyapatite and 50% w/w titanium dioxide in a physical mixture with incorporation of zinc content of 20% w/w and copper content of 8% w/w.

10. A mercury removal unit at natural gas processing plants, comprising the sulfated adsorbents of claim 6.

11. A mercury removal unit at natural gas processing plants, comprising the sulfated adsorbents of claim 8.

* * * * *